(12) United States Patent
Yamada

(10) Patent No.: US 10,976,539 B2
(45) Date of Patent: Apr. 13, 2021

(54) ACTUATOR AND OPTICAL SCANNING DEVICE

(71) Applicant: Kensuke Yamada, Tokyo (JP)

(72) Inventor: Kensuke Yamada, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 204 days.

(21) Appl. No.: 16/282,577

(22) Filed: Feb. 22, 2019

(65) Prior Publication Data

US 2019/0271839 A1 Sep. 5, 2019

(30) Foreign Application Priority Data

Mar. 2, 2018 (JP) .............................. JP2018-037056

(51) Int. Cl.
*G02B 26/08* (2006.01)
*G02B 26/10* (2006.01)

(52) U.S. Cl.
CPC ......... *G02B 26/0858* (2013.01); *G02B 26/10* (2013.01)

(58) Field of Classification Search
CPC ... B81B 3/0064; B81B 3/0078; B81B 3/0067; B81B 3/0072
See application file for complete search history.

(56) References Cited

U.S. PATENT DOCUMENTS

| | | | |
|---|---|---|---|
| 8,830,551 B2 * | 9/2014 | Kitazawa | B81B 7/0016 359/224.1 |
| 9,130,146 B2 * | 9/2015 | Sekine | H01L 41/0475 |
| 2012/0120470 A1 | 5/2012 | Kitazawa et al. | |
| 2015/0116803 A1 | 4/2015 | Horie et al. | |

FOREIGN PATENT DOCUMENTS

| | | |
|---|---|---|
| JP | 2012-123364 | 6/2012 |
| JP | 2013-186145 | 9/2013 |
| JP | 2016-001325 | 1/2016 |

\* cited by examiner

*Primary Examiner* — Robert E. Tallman
(74) *Attorney, Agent, or Firm* — IPUSA, PLLC

(57) ABSTRACT

An actuator includes a driving beam that includes a beam extending in a direction orthogonal to a predetermined axis and supports an object to be driven, a driving source that is formed on a first surface of the beam and causes the object to rotate around the predetermined axis, and a rib formed on a second surface of the beam. A notch is formed in a portion of the driving source corresponding to an end of the rib.

14 Claims, 8 Drawing Sheets

NOTCH IS NOT FORMED

STRESS IN
SEPARATION DIRECTION
MAXIMUM: 7.8 MPa

ACTUATOR AND OPTICAL SCANNING DEVICE

CROSS-REFERENCE TO RELATED APPLICATION

The present application is based upon and claims priority to Japanese Patent Application No. 2018-037056, filed on Mar. 2, 2018, the entire contents of which are incorporated herein by reference.

BACKGROUND OF THE INVENTION

1. Field of the Invention

An aspect of this disclosure relates to an actuator and an optical scanning device.

2. Description of the Related Art

There is a known optical scanning device where a mirror is rotated around a rotational axis to scan light reflected by the mirror by using an actuator including, as a driving source, a piezoelectric element that includes an upper electrode formed on the upper surface of a piezoelectric thin film and a lower electrode formed on the lower surface of the piezoelectric thin film. The actuator also includes an upper wire connected to the upper electrode and a lower wire connected to the lower electrode that are used to apply a voltage to the piezoelectric thin film (see, for example, Japanese Laid-Open Patent Publication No. 2016-001325 and Japanese Patent No. 5876329).

The actuator includes a Micro Electro Mechanical Systems (MEMS) structure for rotating the mirror around the rotational axis, and the MEMS structure greatly deforms in the thickness direction. The MEMS structure may be implemented by a bellows structure to reduce the rigidity in the thickness direction while maintaining the rigidity in the in-plane direction.

FIG. 4 of Japanese Laid-Open Patent Publication No. 2012-123364 discloses a MEMS structure having a bellows structure where a piezoelectric element provided on each cantilever of a bellows is deformed to rotate (or oscillate) a mirror. In the MEMS structure, the cantilever of the bellows warps as a result of expansion and contraction of the piezoelectric element. Because the piezoelectric element expands and contracts not only in the longitudinal direction of the cantilever but also in the lateral direction of the cantilever, the mirror is not only rotated but also translated or displaced in the thickness direction.

When the MEMS structure is used for a projection apparatus that displays an image by scanning a laser beam, the displacement of the mirror in the thickness direction is sufficiently small compared with the scanning range of the image and therefore may not cause a big problem. On the other hand, in an apparatus such as an optical coherence tomography (OCT) apparatus or a Fourier transform infrared spectrometer (FTIR) that uses interference of light, the displacement of the mirror in the thickness direction changes the phase of light reflected by the mirror. Thus, the displacement of the mirror in the thickness direction greatly affects the output of an apparatus such as an OCT apparatus or an FTIR.

SUMMARY OF THE INVENTION

In an aspect of this disclosure, there is provided an actuator including a driving beam that includes a beam extending in a direction orthogonal to a predetermined axis and supports an object to be driven, a driving source that is formed on a first surface of the beam and causes the object to rotate around the predetermined axis, and a rib formed on a second surface of the beam. A notch is formed in a portion of the driving source corresponding to an end of the rib.

DESCRIPTION OF THE PREFERRED EMBODIMENTS

Embodiments of the present invention are described below with reference to the accompanying drawings. Throughout the accompanying drawings, the same reference numbers are used for the same components, and repeated descriptions of those components may be omitted.

Embodiment

Figure 1A:
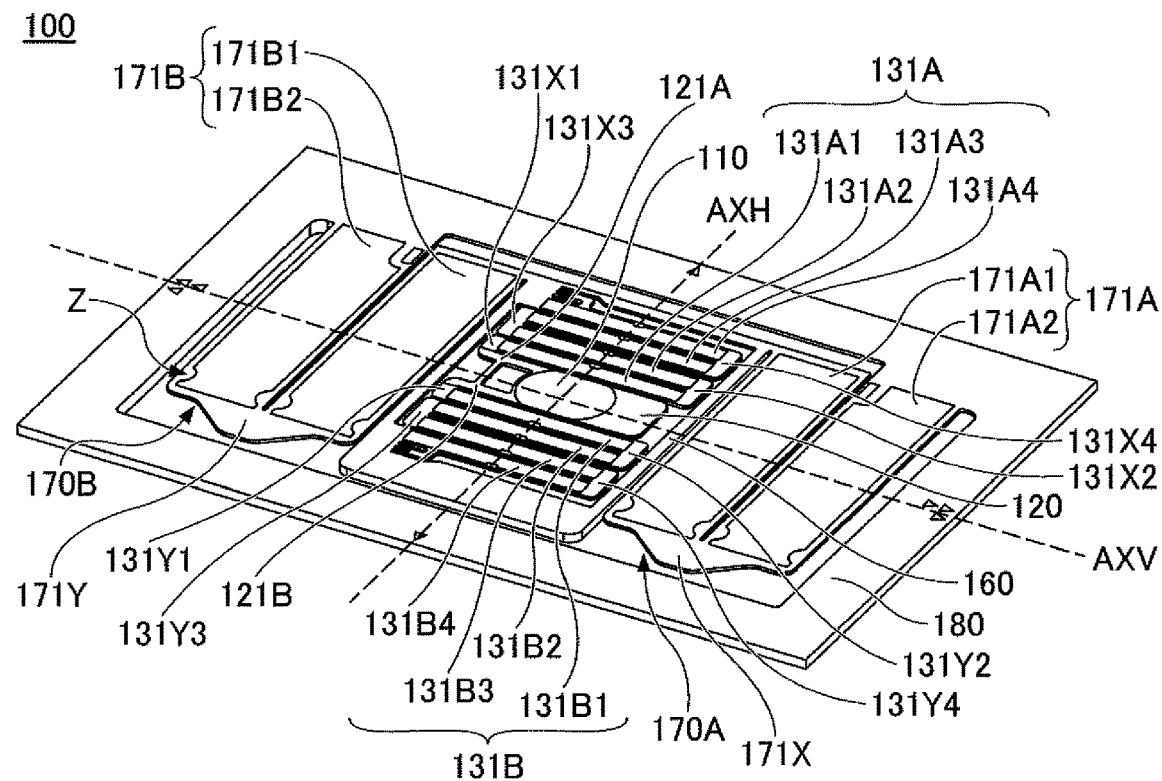
FIG. 1A is a top perspective view of an optical scanner of an optical scanning device according to an embodiment.
Figure 1B:
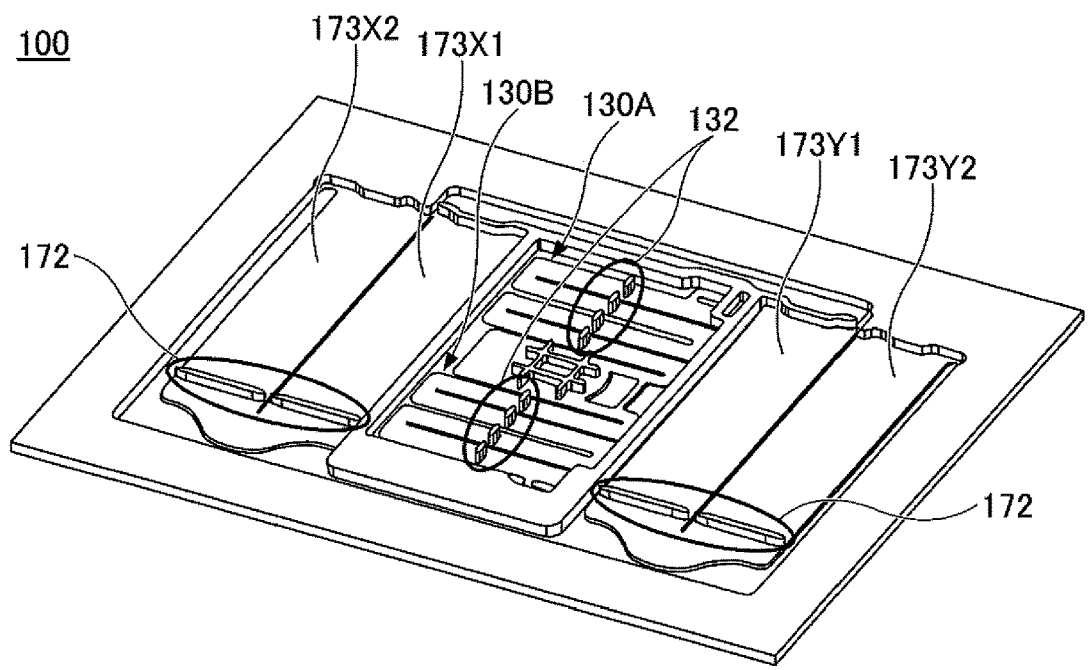
FIG. 1B is a bottom perspective view of the optical scanner of FIG. 1A.
Figure 2:
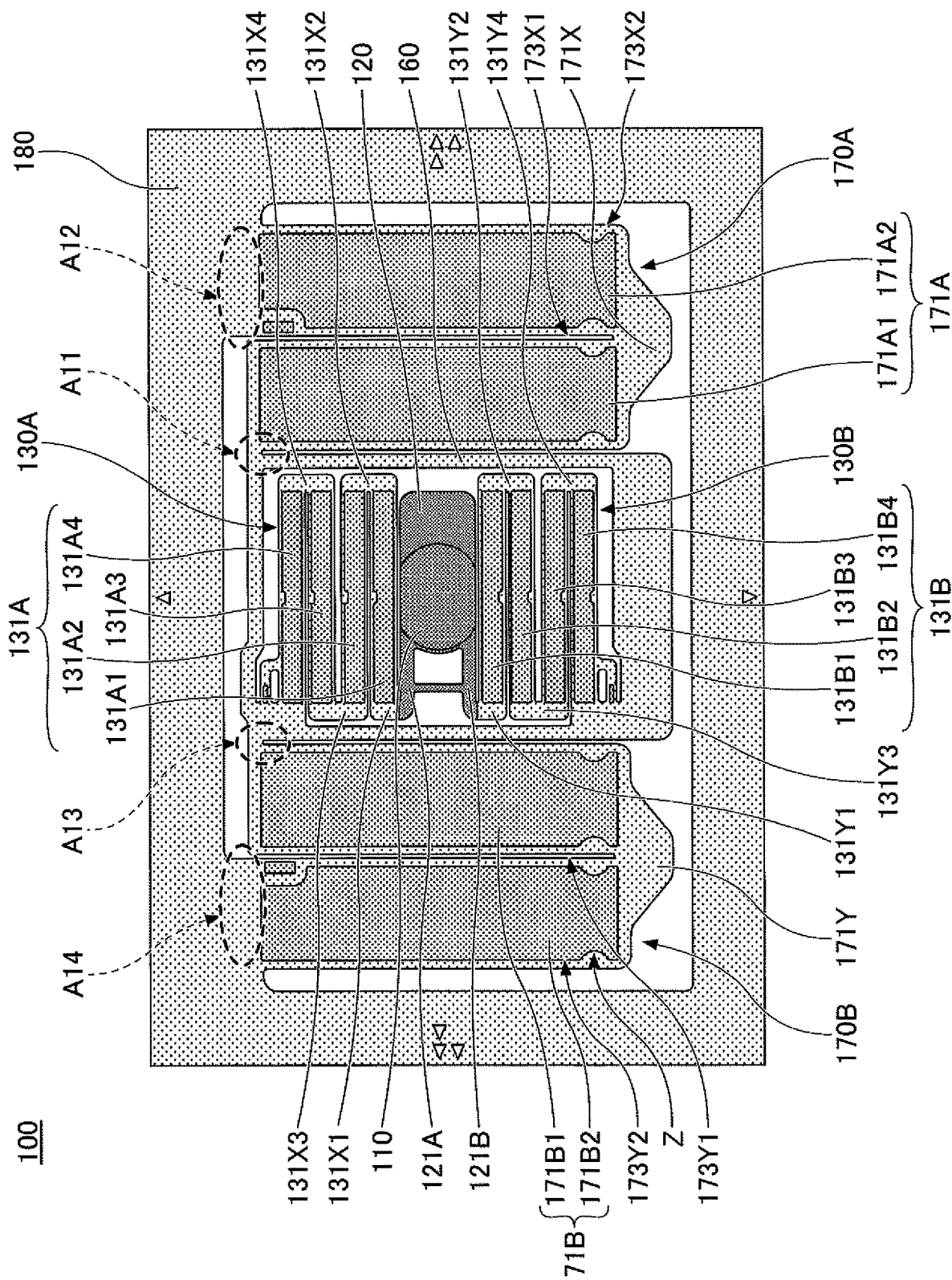
FIG. 2 is a top plan view of the optical scanner of FIG. 1A.

FIG. 1A is a top perspective view of an optical scanner 100 of an optical scanning device according to an embodiment. FIG. 1B is a bottom perspective view of the optical scanner 100 of FIG. 1A. FIG. 2 is a top plan view of the optical scanner 100 of FIG. 1A. The optical scanner 100 may be housed in a ceramic package including a package body and a package cover.

The optical scanner 100 scans an incoming laser beam emitted by a light source by causing a mirror 110 to rotate (or oscillate). The optical scanner 100 is, for example, a MEMS mirror where the mirror 110 is driven by driving sources such as piezoelectric elements. The mirror 110 of the optical scanner 100 reflects an incoming laser beam and scans the reflected laser beam two-dimensionally.

As illustrated in FIGS. 1A, 1B, and 2, the optical scanner 100 includes the mirror 110, a mirror support 120, coupling beams 121A and 121B, horizontal driving beams 130A and 130B, a movable frame 160, vertical driving beams 170A and 170B, and a fixed frame 180. The mirror 110 is supported on an upper surface of the mirror support 120.

The horizontal driving beams 130A and 130B for supporting the mirror 110 and the mirror support 120 are connected to the mirror support 120 and disposed on the corresponding sides of the mirror support 120 for supporting the mirror 110. The horizontal driving beams 130A and 130B are connected to the mirror support 120 via the coupling beams 121A and 121B. The horizontal driving beams 130A and 130B, the coupling beams 121A and 121B, the mirror support 120, and the mirror 110 are supported by the movable frame 160 surrounding these components. The horizontal driving beam 130A includes multiple rectangular horizontal beams that extend in the direction of a vertical-rotation axis AXV that is orthogonal to a horizontal-rotation axis AXH, and ends of adjacent horizontal beams are connected to each other via turnaround parts 131X2, 131X3, and 131X4 such that the horizontal driving beam 130A forms a zig-zag bellows structure as a whole. One end of the horizontal driving beam 130A is connected to the inner side of the movable frame 160, and another end of the horizontal driving beam 130A is connected via a turnaround part 131X1 and the coupling beam 121A to the mirror support 120. The horizontal driving beam 130B includes multiple rectangular horizontal beams that extend in the direction of the vertical-rotation axis AXV that is orthogonal to the horizontal-rotation axis AXH, and ends of adjacent horizontal beams are connected to each other via turnaround parts 131Y2, 131Y3, and 131Y4 such that the horizontal driving beam 130B forms a zig-zag bellows structure as a whole. One end of the horizontal driving beam 130B is connected to the inner side of the movable frame 160, and another end of the horizontal driving beam 130B is connected via a turnaround part 131Y1 and the coupling beam 121B to the mirror support 120.

The vertical driving beams 170A and 170B connected to the movable frame 160 are disposed on the corresponding sides of the movable frame 160. The vertical driving beam 170A includes multiple rectangular vertical beams 173X1 and 173X2 that extend in the direction of the horizontal-rotation axis AXH, and ends of adjacent vertical beams are connected to each other via a turnaround part 171X such that the vertical driving beam 170A forms a zig-zag bellows structure as a whole. One end of the vertical driving beam 170A is connected to the inner side of the fixed frame 180, and another end of the vertical driving beam 170A is connected to the outer side of the movable frame 160. The vertical driving beam 170B includes multiple rectangular vertical beams 173Y1 and 173Y2 that extend in the direction of the horizontal-rotation axis AXH, and ends of adjacent vertical beams are connected to each other via a turnaround part 171Y such that the vertical driving beam 170B forms a zig-zag bellows structure as a whole. One end of the vertical driving beam 170B is connected to the inner side of the fixed frame 180, and another end of the vertical driving beam 170B is connected to the outer side of the movable frame 160.

The horizontal driving beams 130A and 130B include, respectively, horizontal driving sources 131A and 131B that are piezoelectric elements. Also, the vertical driving beams 170A and 170B include, respectively, vertical driving sources 171A and 171B that are piezoelectric elements. The horizontal driving beams 130A and 130B and the vertical driving beams 170A and 170B function as an actuator that causes the mirror 110 to rotate (or oscillate) vertically and horizontally to scan a laser beam.

On the upper surfaces of the horizontal driving beams 130A and 130B, the horizontal driving sources 131A and 131B are formed for respective horizontal beams that are rectangular units including no curved section. Each of the horizontal driving sources 131A is a piezoelectric element formed on the upper surface of the horizontal driving beam 130A and includes a piezoelectric thin film, an upper electrode formed on the upper surface of the piezoelectric thin film, and a lower electrode formed on the lower surface of the piezoelectric thin film. Each of the horizontal driving sources 131B is a piezoelectric element formed on the upper surface of the horizontal driving beam 130B and includes a piezoelectric thin film, an upper electrode formed on the upper surface of the piezoelectric thin film, and a lower electrode formed on the lower surface of the piezoelectric thin film.

In each of the horizontal driving beams 130A and 130B, a driving voltage with a first waveform and a driving voltage with a second waveform obtained by vertically inverting the first waveform with reference to the median value of the first waveform are applied to horizontal driving sources 131A/131B on adjacent horizontal beams to cause the adjacent horizontal beams to warp in opposite vertical directions, and the accumulation of the vertical movement of the horizontal beams is transmitted to the mirror support 120. With the movement of the horizontal driving beams 130A and 130B, the mirror 110 and the mirror support 120 rotate (or oscillate) around the horizontal-rotation axis AXH. The direction of this rotation (or oscillation) is referred to as a horizontal direction, and the axis of this rotation (or oscillation) that passes through the center of the light reflection surface of the mirror 110 is referred to as the horizontal-rotation axis AXH. For example, nonresonant oscillation may be used for the horizontal driving by the horizontal driving beams 130A and 130B.

For example, the horizontal driving source 131A includes horizontal driving sources 131A1, 131A2, 131A3, and 131A4 that are formed on the first through fourth horizontal beams constituting the horizontal driving beam 130A. The horizontal driving source 131B includes horizontal driving sources 131B1, 131B2, 131B3, and 131B4 that are formed on the first through fourth horizontal beams constituting the horizontal driving beam 130B. In this case, the mirror 110 and the mirror support 120 can be rotated in the horizontal direction by driving the horizontal driving sources 131A1, 131B1, 131A3, and 131B3 using the first waveform and driving the horizontal driving sources 131A2, 131B2, 131A4, and 131B4 using the second waveform that is obtained by vertically inverting the first waveform with reference to the median value of the first waveform.

On the upper surfaces of the vertical driving beams 170A and 170B, the vertical driving sources 171A and 171B are formed for respective vertical beams 173X1, 173X2, 173Y1, and 173Y2 that are rectangular units including no curved section. Each vertical driving source 171A is a piezoelectric element formed on the upper surface of the vertical driving beam 170A and includes a piezoelectric thin film, an upper electrode formed on the upper surface of the piezoelectric thin film, and a lower electrode formed on the lower surface of the piezoelectric thin film. Each vertical driving source 171B is a piezoelectric element formed on the upper surface of the vertical driving beam 170B and includes a piezoelectric thin film, an upper electrode formed on the upper surface of the piezoelectric thin film, and a lower electrode formed on the lower surface of the piezoelectric thin film.

In each of the vertical driving beams 170A and 170B, a driving voltage with a first waveform and a driving voltage with a second waveform obtained by vertically inverting the first waveform with reference to the median value of the first waveform are applied to vertical driving sources 171A/171B on adjacent vertical beams 173X1-173X2 or 173Y1-173Y2 to cause the adjacent vertical beams to warp in opposite vertical directions, and the accumulation of the vertical movement of the vertical beams is transmitted to the movable frame 160. With the movement of the vertical driving beams 170A and 170B, the mirror 110 connected to the movable frame 160 rotates (or oscillates) around a rotation axis that is orthogonal to the horizontal-rotation axis AXH. The direction of this rotation (or oscillation) is referred to as a vertical direction, and this rotation axis that passes through the center of the light reflection surface of the mirror 110 is referred to as a vertical-rotation axis AXV. For example, nonresonant oscillation may be used for the vertical driving by the vertical driving beams 170A and 170B.

For example, the vertical driving source 171A includes vertical driving sources 171A1 and 171A2 that are formed on the first and second vertical beams 173X1 and 173X2 constituting the vertical driving beam 170A. The vertical driving source 171B includes vertical driving sources 171B1 and 171B2 that are formed on the first and second vertical beams 173Y1 and 173Y2 constituting the vertical driving beam 170B. In this case, the movable frame 160 connected to the mirror 110 can be rotated in the vertical direction by driving the vertical driving sources 171A1 and 171B1 using the first waveform and driving the vertical driving sources 171A2 and 171B2 using the second waveform that is obtained by vertically inverting the first waveform with reference to the median value of the first waveform.

In the optical scanning device of the present embodiment, the MEMS structure implementing the actuator is formed of a silicon-on-insulator (SOI) substrate including a support layer, a buried oxide (BOX) layer, and an active layer. Each of the fixed frame 180 and the movable frame 160 is comprised of the support layer, the BOX layer, and the active layer. On the other hand, each of components such as the horizontal driving beams 130A and 130B and the vertical driving beams 170A and 170B other than the fixed frame 180 and the movable frame 160 may be comprised of the active layer alone (one layer) or comprised of the BOX layer and the active layer (two layers).

In the optical scanning device of the present embodiment, the horizontal driving sources 131A and 131B are formed on first surfaces (upper surfaces) of the horizontal beams constituting the horizontal driving beams 130A and 130B, and ribs 132 are formed on second surfaces (lower surfaces) of the horizontal beams. The ribs 132 are positioned in the middle of the horizontal beams, i.e., along the horizontal-rotation axis AXH. Each rib 132 has a width in the longitudinal direction of the horizontal beam and a length in the lateral direction of the horizontal beam, and the width of the rib 132 is shorter than the length of the rib 132. For example, when a wafer including multiple MEMS structures is diced to manufacture separate MEMS structures, the ribs 132 formed on the second surfaces (lower surfaces) of the horizontal beams constituting the horizontal driving beams 130A and 130B can prevent the bellows structures from being excessively vibrated and damaged by a water flow and vibration generated during the dicing.

Also in the optical scanning device of the present embodiment, the vertical driving sources 171A and 171B are formed on first surfaces (upper surfaces) of the vertical beams 173X1, 173X2, 173Y1, and 173Y2 constituting the vertical driving beams 170A and 170B, and ribs 172 are formed on second surfaces (lower surfaces) of the vertical beams 173X1, 173X2, 173Y1, and 173Y2. Each of the ribs 172 is positioned such that a distance from the joint between the corresponding one of the vertical beams 173X1, 173X2, 173Y1, and 173Y2 and the corresponding one of the turn-around parts 171X and 171Y becomes 10 to 20% of the length of the vertical beams 173X1, 173X2, 173Y1, and 173Y2. Each of the ribs 172 has a width in the longitudinal direction of the vertical beams 173X1, 173X2, 173Y1, and 173Y2 and a length in the lateral direction of the vertical beams 173X1, 173X2, 173Y1, and 173Y2, and the width of the ribs 172 is shorter than the length of the ribs 172. The ribs 172 formed on the second surfaces (lower surfaces) of the vertical beams constituting the vertical driving beams 170A and 170B can prevent the vertical driving beams 170A and 170B from unnecessarily warping in a direction (the width or lateral direction of the vertical beams 173X1, 173X2, 173Y1, and 173Y2) that is orthogonal to the direction of vertical warping of the vertical driving beams 170A and 170B and thereby reduce the displacement of the mirror support 120 in the thickness direction.

In the optical scanning device of the present embodiment, a rib is also formed on the lower surface of the mirror support 120 that is opposite a surface of the mirror support 120 on which the mirror 110 is formed. The rib formed on the lower surface of the mirror support 120 can prevent the mirror support 120 from unnecessarily warping.

The ribs 172 formed on the second surfaces (lower surfaces) of the vertical beams 173X1, 173X2, 173Y1, and 173Y2 constituting the vertical driving beams 170A and 170B have a height that is the same as the height (thickness) of the fixed frame 180 and the movable frame 160. When the MEMS structure that functions as an actuator of the optical scanning device is formed of an SOI substrate, the ribs 172 are formed of the BOX layer and the support layer on the lower surfaces of the vertical beams 173X1, 173X2, 173Y1, and 173Y2 formed of the active layer. The horizontal beams constituting the horizontal driving beams 130A and 130B are formed of the active layer, and the ribs 132 formed on the second surfaces (lower surfaces) of the horizontal beams are formed of the BOX layer and the support layer. The mirror support 120 is formed of the active layer, and the rib on the lower surface of the mirror support 120 (the surface that is opposite a surface of the mirror support 120 on which the mirror 110 is formed) is formed of the BOX layer and the support layer. Instead of using the support layer of an SOI substrate, the ribs may be formed as steps by etching bulk silicon.

Figure 3:
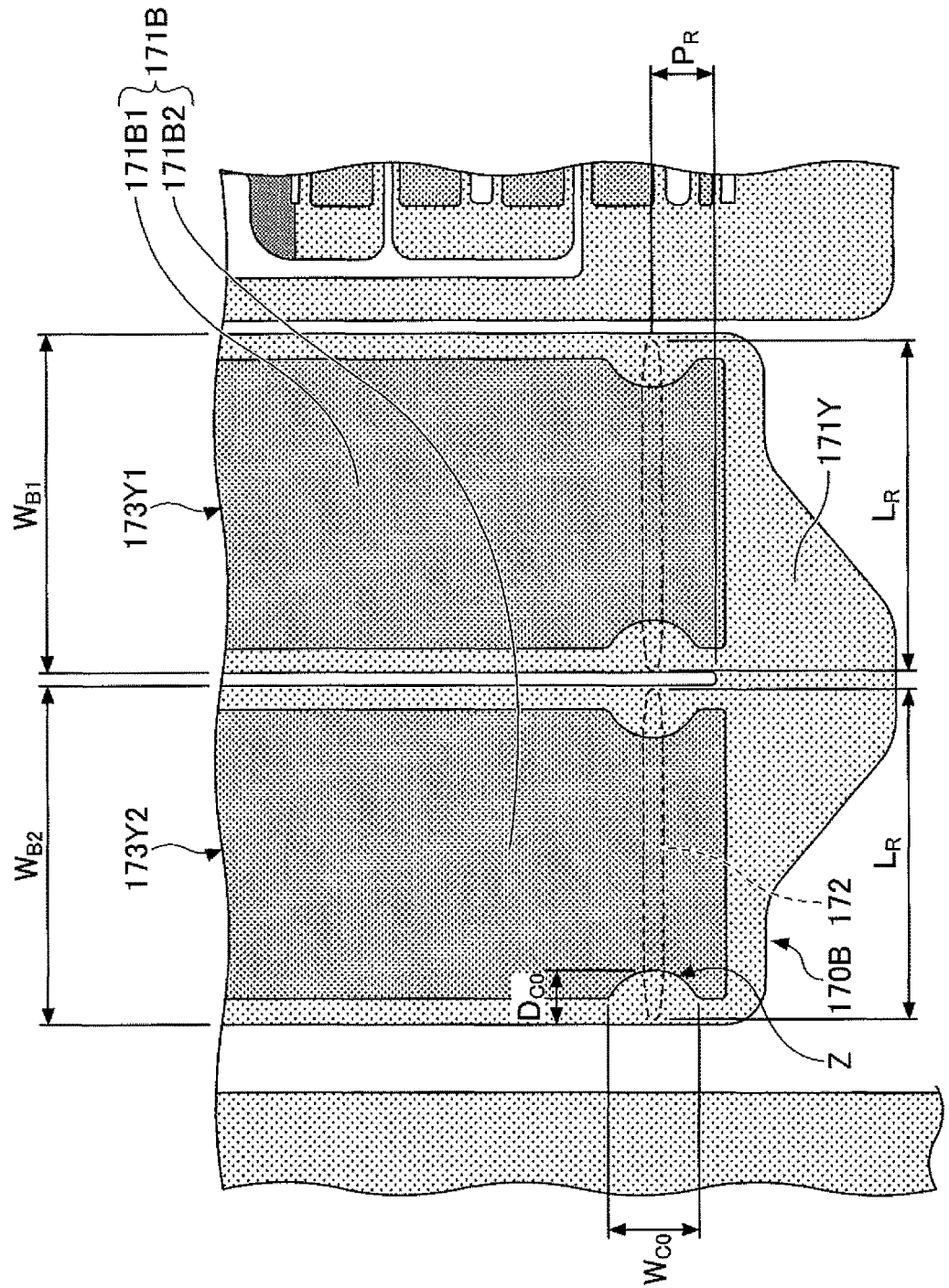
FIG. 3 is an enlarged view of a portion of the optical scanner of FIG. 2.

FIG. 3 is an enlarged view of a portion of the optical scanner 100. The vertical driving sources 171B (171B1 and 171B2), which are piezoelectric elements, are formed on first surfaces (upper surfaces) of the vertical beams 173Y1 and 173Y2 constituting the vertical driving beam 170B, and the ribs 172 are formed on second surfaces (lower surfaces) of the vertical beams 173Y1 and 173Y2 at positions indicated by dotted lines. Also, in the optical scanner 100 of the optical scanning device of the present embodiment, notches Z are formed in the vertical driving sources 171B1 and 171B2 at positions corresponding to the ends of the ribs 172. The notches Z have a semicircular shape in plan view of the vertical beams 173Y1 and 173Y2 and are formed by removing portions of the vertical driving sources 171B1 and 171B2 on the first surfaces of the vertical beams 173Y1 and 173Y2.

Although the notches Z are described using the vertical driving beam 170B in FIG. 3, the vertical driving beam 170A has substantially the same configuration.

In the vertical driving beams 170A and 170B, when voltages are applied to the vertical driving sources 171A and 171B, the vertical beams 173X1, 173X2, 173Y1, and 173Y2 warp in the longitudinal direction and also warp slightly in the lateral direction. The warp in the longitudinal is necessary to rotate the mirror support 120. On the other hand, the warp in the lateral direction causes the mirror support 120 to be displaced in the thickness direction in synchronization with the rotating movement.

In the optical scanning device of the present embodiment, the ribs 172 are formed on the second surfaces (lower surfaces) of the vertical beams 173X1, 173X2, 173Y1, and 173Y2 constituting the vertical driving beams 170A and 170B, and the ribs 172 have a shape that is short in the longitudinal direction of the vertical beams 173X1, 173X2, 173Y1, and 173Y2 and is long in the lateral direction of the vertical beams 173X1, 173X2, 173Y1, and 173Y2. The ribs 172 can prevent the vertical beams 173X1, 173X2, 173Y1, and 173Y2 from warping in the lateral direction and reduce the displacement of the mirror support 120 in the thickness direction.

The optical scanner 100 of the present embodiment where the warp of the vertical beams 173X1, 173X2, 173Y1, and 173Y2 in the lateral direction is prevented and the displacement of the mirror support 120 in the thickness direction is reduced can be used for an apparatus such as an OCT apparatus or an FTIR that uses interference of light for measurement.

For example, in the vertical beam 173Y2 located first from the outer end, a width $W_{B2}$ of the vertical beam 173Y2 is 1.83 mm, a length $L_R$ of the rib 172 is 1.79 mm, and the width of the rib 172 is 0.1 mm. In the vertical beam 173Y1 located second from the outer end, a width $W_{B1}$ of the vertical beam 173Y1 is 1.80 mm, a length $L_R$ of the rib 172 is 1.76 mm, and the width of the rib 172 is 0.1 mm.

The length of each of the ribs 172 in the lateral direction (or the width direction) of the vertical beams 173X1, 173X2, 173Y1, and 173Y2 is preferably greater than or equal to 70% of the width of the corresponding one of the vertical beams 173X1, 173X2, 173Y1, and 173Y2. With this configuration, the ribs 172 can sufficiently reduce the displacement of the mirror support 120 in the thickness direction.

The distance of each of the ribs 172 from the joint between the corresponding one of the vertical beams 173X1, 173X2, 173Y1, and 173Y2 and the corresponding one of the turnaround parts 171X and 171Y is preferably greater than or equal to 10% and less than or equal to 20% of the length of the corresponding one of the vertical beams 173X1, 173X2, 173Y1, and 173Y2 in the longitudinal direction. This configuration makes it possible to reduce the displacement of the mirror support 120 in the thickness direction and prevent a decrease in the tilt angle sensitivity of the mirror 110 (the tilt angle of the mirror 110 per one voltage applied to the piezoelectric element).

When the ribs 172 are provided to reduce the displacement of the mirror support 120 in the thickness direction, the ribs 172 suppress the warp of the vertical beams 173X1, 173X2, 173Y1, and 173Y2 in the lateral direction and as a result, a corresponding stress is applied to a joint at an end of each rib 172 (i.e., an end portion of the rib 172 that is joined to the vertical beam). When the stress exceeds a critical stress, a crack develops quickly and the rib 172 may be broken. In the present embodiment, the notches Z are formed in the vertical driving sources 171A and 171B at positions corresponding to the ends of the ribs 172. With this configuration, the width of portions of the vertical driving sources 171A and 171B directly above the ribs 172 is reduced and the warp of the vertical beams 173X1, 173X2, 173Y1, and 173Y2 in the lateral direction is decreased. As a result, the stress caused by the warp is reduced. Also, a stress transmitted from other portions is also dispersed by a silicon active layer between the other portions and the ribs 172. Thus, the notches Z can reduce the stress applied to the joints at the ends of the ribs 172.

For example, a width $W_{co}$ of the notches Z is 0.4 mm, and a depth $D_{co}$ of the notches Z is 0.16 mm.

As described above, in the optical scanner 100 of the optical scanning device of the present embodiment, the ribs 172 are formed on the second surfaces (lower surfaces) of the vertical beams constituting the vertical driving beams 170A and 170B. The ribs 172 can prevent the vertical driving beams 170A and 170B from unnecessarily warping in a direction (the width or lateral direction of the vertical beams 173X1, 173X2, 173Y1, and 173Y2) that is orthogonal to the direction of vertical warping of the vertical driving beams 170A and 170B and thereby reduce the displacement of the mirror support 120 in the thickness direction. Also, the notches Z are formed in the vertical driving sources 171A and 171B at positions corresponding to the ends of the ribs 172 to reduce the stress applied to the joints at the ends of the ribs 172. Also, the ribs 172 are disposed such that the distance of each of the ribs 172 from the joint between the corresponding one of the vertical beams 173X1, 173X2, 173Y1, and 173Y2 and the corresponding one of the turnaround parts 171X and 171Y becomes greater than or equal to 10% and less than or equal to 20% of the length of the corresponding one of the vertical beams 173X1, 173X2, 173Y1, and 173Y2 in the longitudinal direction. This configuration makes it possible to reduce the displacement of the mirror support 120 in the thickness direction, and prevent a decrease in the tilt angle sensitivity of the mirror 110 (the tilt angle of the mirror 110 per one voltage applied to the piezoelectric element).

Example 1

Figure 4:
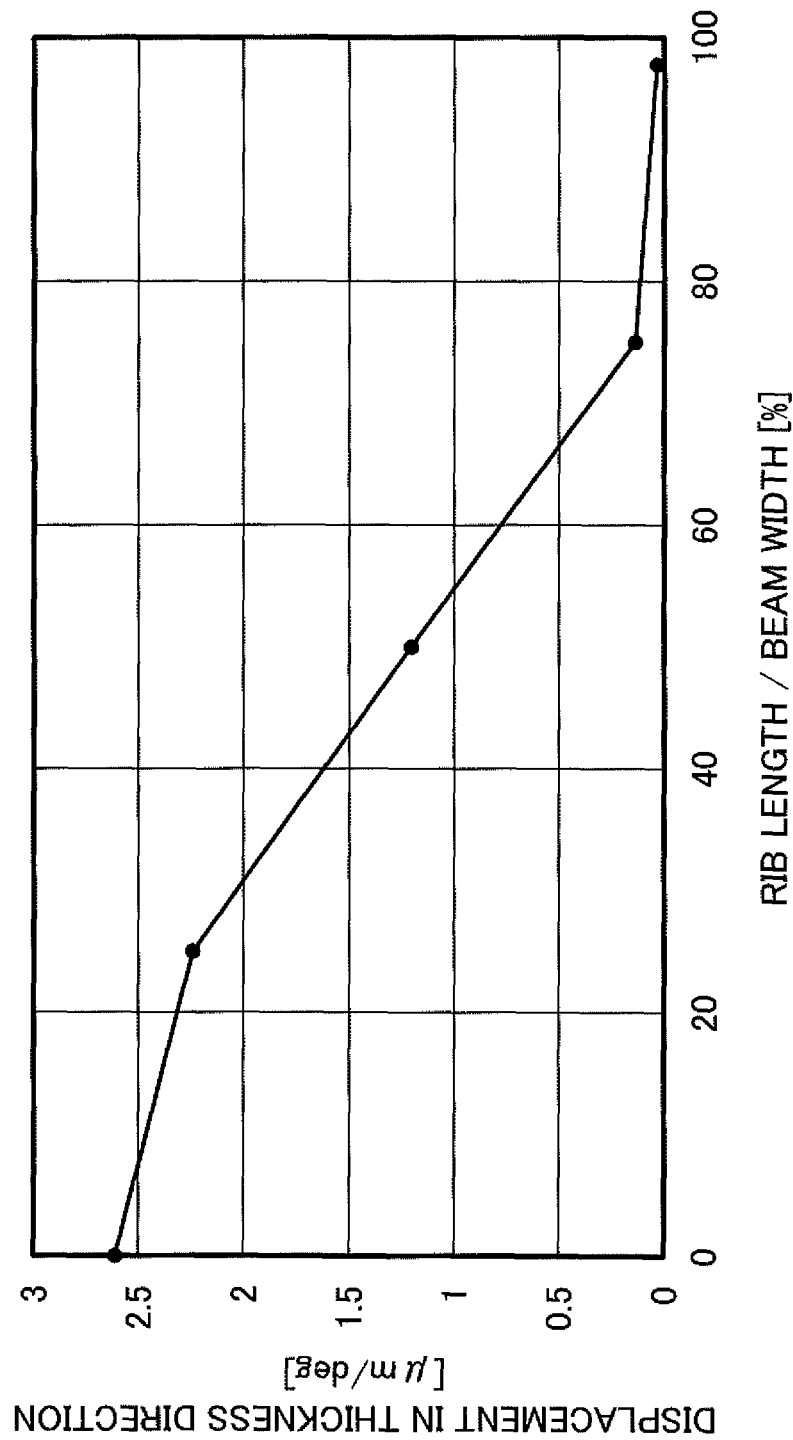
FIG. 4 is a graph indicating a relationship between the displacement of a mirror support in the thickness direction and a rib length.

FIG. 4 is a graph indicating a relationship between the displacement of the mirror support 120 in the thickness direction and a rib length. FIG. 4 indicates results of a simulation where values of the displacement of the mirror support 120 in the thickness direction when the mirror support 120 is tilted ±1 degree are calculated by changing the percentage of the length of the ribs 172 relative to the width of the vertical beams 173X1, 173X2, 173Y1, and 173Y2 (rib length/beam width). In FIG. 4, the vertical axis indicates "displacement in thickness direction", and the horizontal axis indicates "rib length/beam width". Here, when "rib length/beam width" is zero, it indicates that the ribs 172 are not provided. When the ribs 172 are not provided, the displacement in the thickness direction is ±2.6 μm. When the length of the ribs 172 is substantially the same as the beam width, the displacement in the thickness direction is ±0.03 μm. Thus, the simulation results indicate that the ribs 172 can reduce the displacement of the mirror support 120 in the thickness direction. The effect of reducing the displacement in the thickness direction increases as the rib length increases. To obtain a sufficient effect, the length of the ribs 172 is preferably greater than or equal to 70% of the beam width.

Example 2

Figure 5:
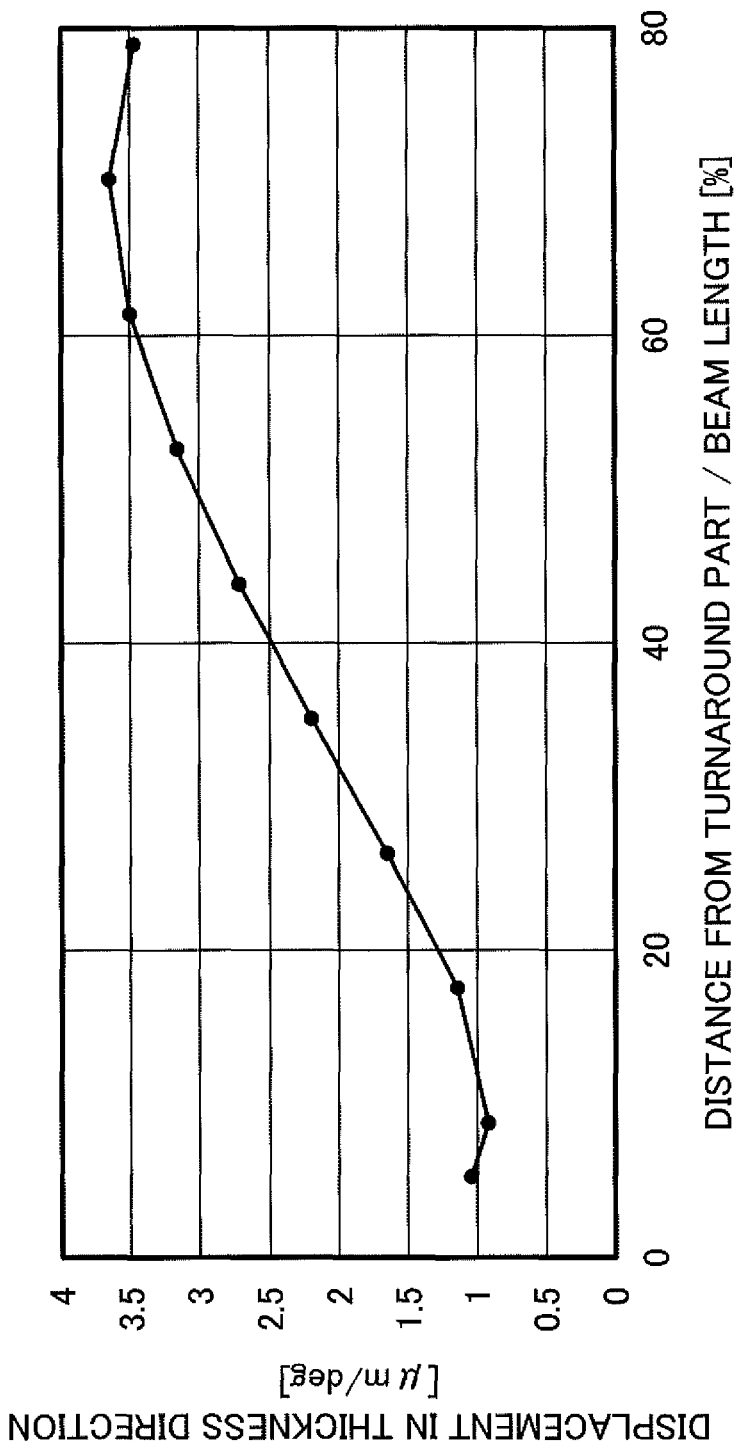
FIG. 5 is a graph indicating a relationship between the displacement of a mirror support in the thickness direction and a rib position.

FIG. 5 is a graph indicating a relationship between the displacement of the mirror support 120 in the thickness direction and a rib position. FIG. 5 indicates results of a simulation where values of the displacement of the mirror support 120 in the thickness direction when the mirror support 120 is tilted ±1 degree are calculated by changing the position of the ribs 172. In FIG. 5, the vertical axis indicates "displacement in thickness direction", and the horizontal axis indicates "distance from turnaround part/beam length". The "distance from turnaround part" indicates the distance between the ribs 172 and the joints between the vertical beams 173X1, 173X2, 173Y1, and 173Y2 and the turnaround parts 171X and 171Y The effect of reducing the displacement in the thickness direction increases as the position of the ribs 172 becomes closer to the turnaround parts 171X and 171Y. However, if the "distance from turnaround part/beam length" becomes less than 10%, the tilt angle sensitivity of the mirror 110 (the tilt angle of the mirror 110 per one voltage applied to the piezoelectric element) decreases. Accordingly, the "distance from turnaround part/beam length" is preferably greater than or equal to 10% and less than or equal to 20%.

Example 3

Figure 6A:
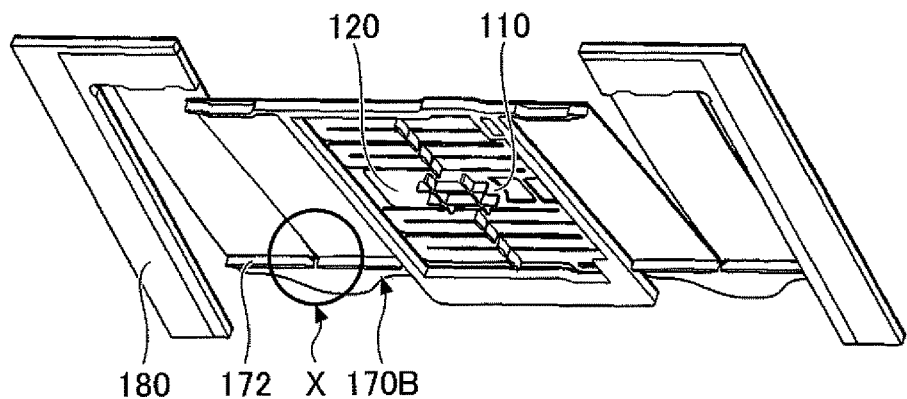
FIG. 6A is a drawing illustrating the posture of a vertical driving beam when an optical scanner is driven.
Figure 6B:
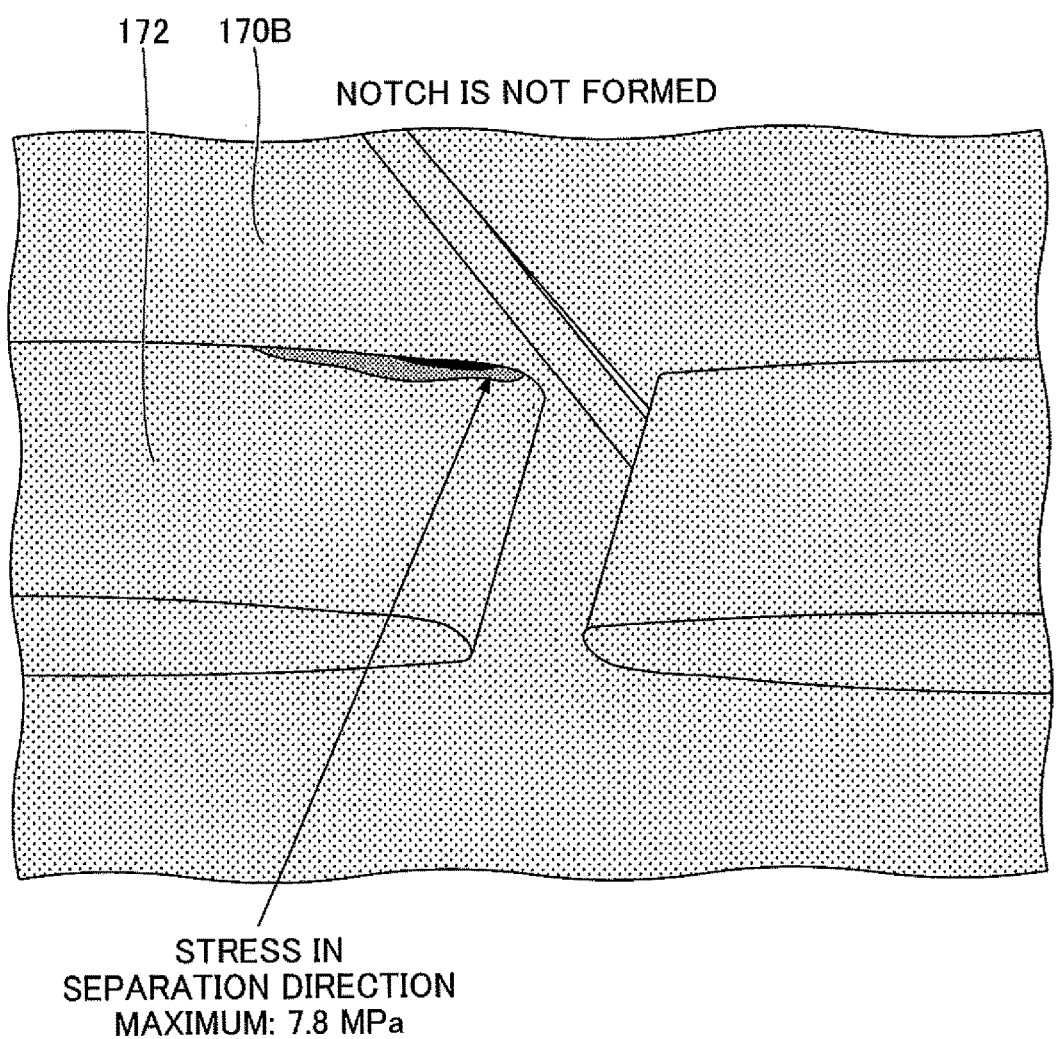
FIG. 6B is a drawing illustrating a stress generated when the optical scanner is driven as in FIG. 6A.

FIG. 6A is a drawing illustrating the posture of the vertical driving beam 170B when the optical scanner 100 is driven. FIG. 6B is a drawing illustrating a stress generated when the optical scanner 100 is driven as in FIG. 6A. As illustrated in FIG. 6A, the rib 172 can reduce the warp of a vertical beam of the vertical driving beam 170B when the optical scanner 100 is driven vertically. In this state, a stress in the separation direction is applied to an end of the rib 172. Particularly, when the optical scanner 100 is formed of an SOI substrate, a crack may be formed in the BOX layer whose strength is lower than the silicon active layer, and the vertical driving beam 170B or the rib 172 may be damaged.

FIG. 6B is an enlarged view of an area X in FIG. 6A. In FIG. 6B, a shade with higher density indicates a higher stress. When the notches Z are not formed in the vertical driving sources 171A and 171B, a high stress is applied to the joint at the end of the rib 172. In this case, the maximum stress applied to the rib 172 in the separation direction when the mirror 110 is tilted one degree is 7.8 MPa. When the notches Z are formed in the vertical driving sources 171A and 171B as in the present embodiment, the width of the portions of the vertical driving sources 171A and 171B directly above the ribs 172 decreases. As a result, the warp in the lateral direction decreases and the stress is reduced. Also, the stress caused by the warp in the lateral direction in other portions of the vertical driving sources 171A and 171B is dispersed by the silicon active layer between the ribs 172 and the vertical driving sources 171A and 171B. Thus, the notches Z can reduce the stress applied to the joint at the end of the rib 172. In this case, the maximum stress applied to the rib 172 in the separation direction when the mirror 110 is tilted one degree is 5.8 MPa. Thus, the stress is reduced by about 30%.

Example 4

Figure 7:
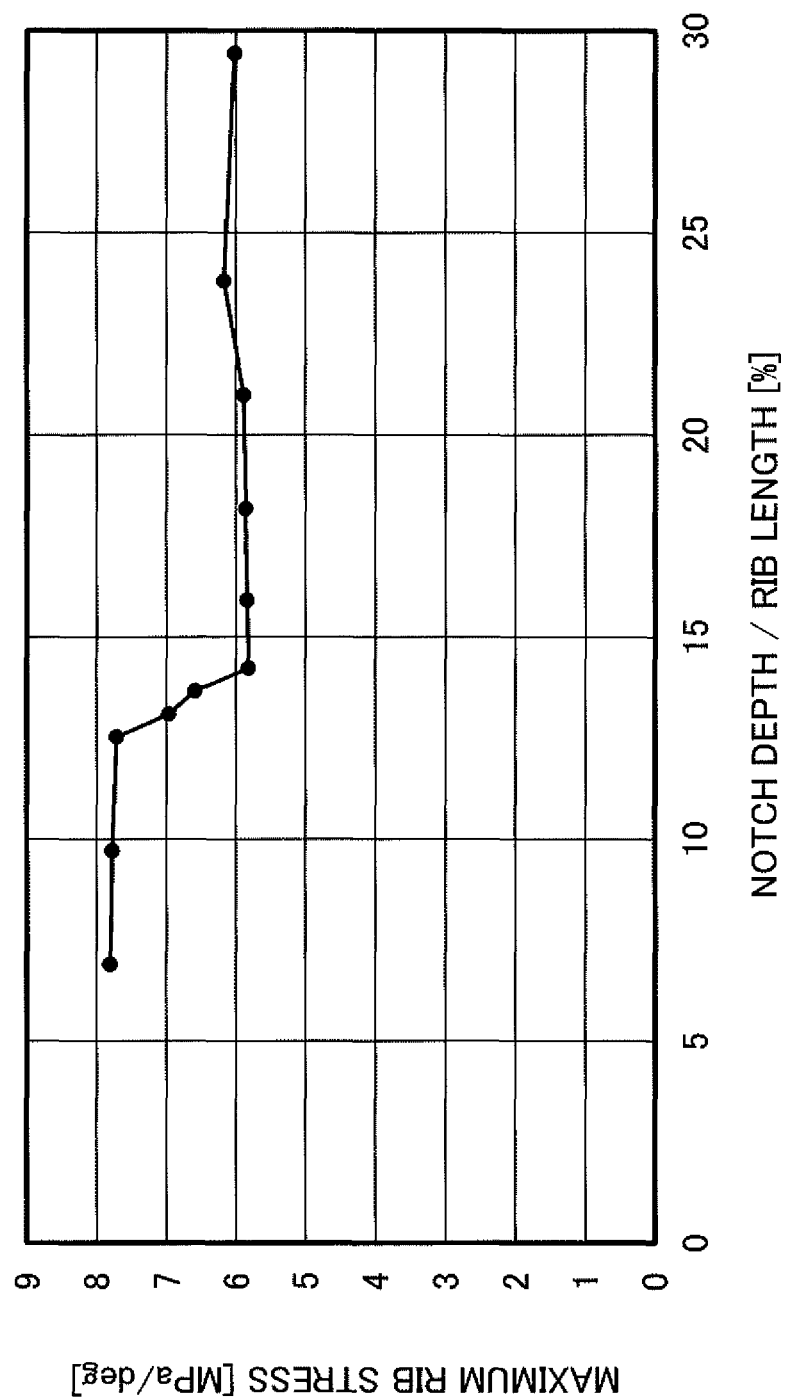
FIG. 7 is a graph indicating a relationship between a maximum rib stress and a notch depth.

FIG. 7 is a graph indicating a relationship between a maximum rib stress and a notch depth. FIG. 7 indicates results of a simulation where values of the maximum stress (maximum rib stress) applied to the joint at the end of the rib 172 when the mirror support 120 is tilted ±1 degree are calculated by changing the percentage of a depth $D_{co}$ of the notch Z relative to the length of the rib 172 (notch depth/rib length). In FIG. 7, the vertical axis indicates "maximum rib stress", and the horizontal axis indicates "notch depth/rib length". As illustrated in FIG. 3, the depth $D_{co}$ of the notch Z (notch depth) is represented by a distance between an end of the rib 172 and a point on the contour of the notch Z that is farthest from the end of the rib 172 in the longitudinal direction of the rib 172. Thus, the notch depth corresponds to the size of the notch Z in the longitudinal direction of the rib 172. The stress applied to the rib 172 can be reduced by making the notch depth greater than or equal to 14% of the rib length. The effect of reducing the stress does not greatly increase even when the "notch depth/rib length" is made greater than 14%. On the other hand, as the notch depth increases, the area of the vertical driving sources 171A and 171B decreases, and the tilt angle sensitivity of the mirror 110 decreases. Accordingly, the notch depth is preferably less than or equal to 14% of the rib length and is more preferably about 14% of the rib length.

Example 5

Figure 8:
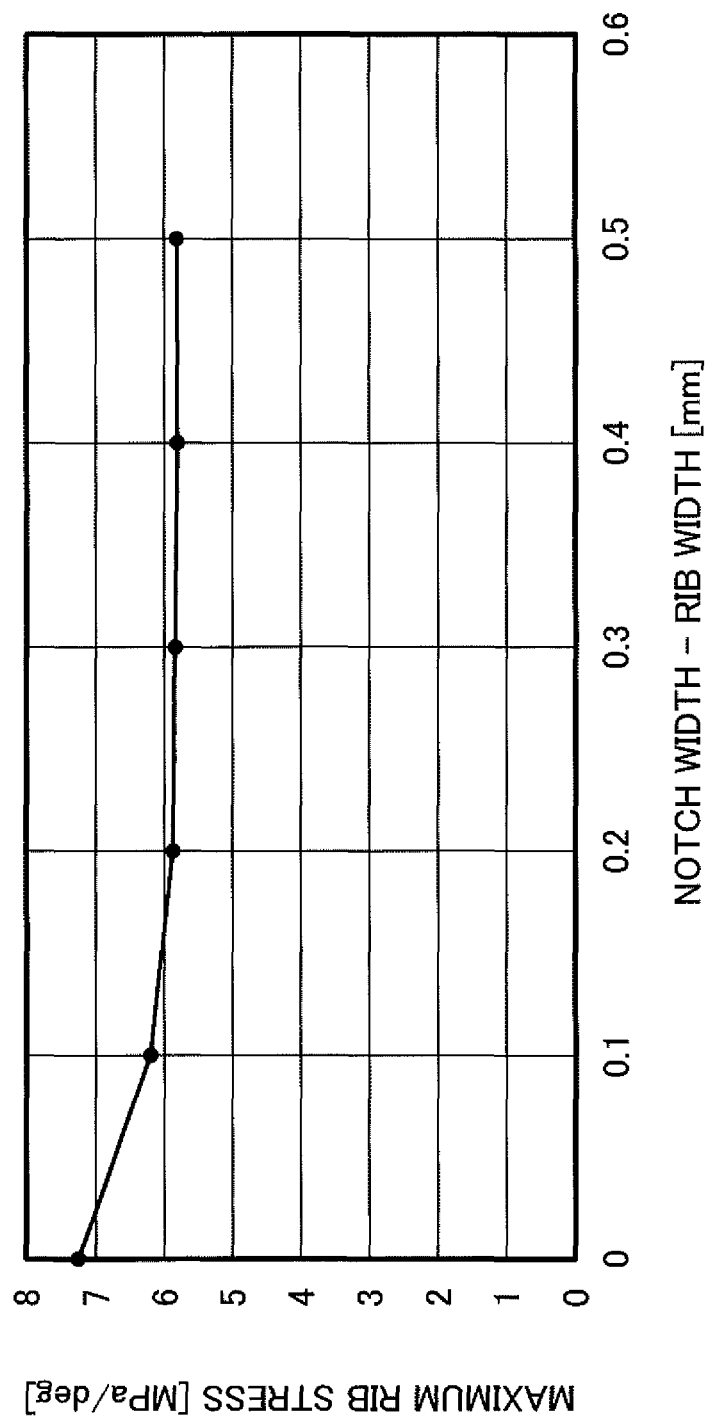
FIG. 8 is a graph indicating a relationship between a maximum rib stress and a notch width.

FIG. 8 is a graph indicating a relationship between a maximum rib stress and a notch width. FIG. 8 indicates results of a simulation where values of the maximum stress (maximum rib stress) applied to the joint at the end of the rib 172 when the mirror support 120 is tilted ±1 degree are calculated by changing the difference between a width $W_{co}$ of the notch Z and the width of the rib 172 (notch width–rib width). In FIG. 8, the vertical axis indicates "maximum rib stress", and the horizontal axis indicates "notch width–rib width". The maximum rib stress decreases as the width of the notch Z increases while the difference between the width of the notch Z and the width of the rib 172 is less than 0.2 mm. However, when the difference becomes greater than or equal to 0.2 mm, the maximum rib stress does not substantially change even if the width of the notch Z is increased further. On the other hand, as the notch width increases, the area of the vertical driving sources 171A and 171B decreases, and the tilt angle sensitivity of the mirror 110 decreases. Accordingly, the "notch width–rib width" is preferably less than or equal to 0.2 mm and is more preferably about 0.2 mm.

An actuator and an optical scanning device according to embodiments of the present invention are described above. However, the present invention is not limited to the specifically disclosed embodiments, and variations and modifications may be made without departing from the scope of the present invention. For example, although an actuator is used for an optical scanning device including a mirror in the above embodiments, the actuator may also be used to drive an object other than a mirror, and the present invention may also be applied to a device that does not include a mirror. An optical scanning device according to an embodiment of the present invention is preferably used for an optical coherence tomography device of a funduscope. In an optical coherence tomography device of a funduscope, resonant driving is not necessary because one of the axes operates at high speed as in a projector, and it is desired that tilt angles can be freely set and adjusted to perform optical scanning. Accordingly, an optical scanner where nonresonant driving is used for both of two axes as in the above embodiments is preferably used for an optical coherence tomography device of a funduscope. An optical scanning device according to an embodiment of the present invention may also be used for a projection device. In the above embodiment, ribs are formed on the lower surfaces of vertical beams constituting a vertical driving beam, and notches are formed in vertical driving sources at positions corresponding to the ends of the ribs. However, the present invention is not limited to this embodiment. Even when notches are not formed in the vertical driving sources, the ribs are preferably positioned such that the "distance from turnaround part/beam length" becomes greater than or equal to 10% and less than or equal to 20%. This configuration makes it possible to reduce the displacement of a mirror support in the thickness direction and prevent a decrease in the tilt angle sensitivity of a mirror (the tilt angle of the mirror per one voltage applied to the piezoelectric element).

An aspect of this disclosure provides an optical scanning device including an actuator whose displacement in the thickness direction is prevented so that the optical scanning device can be used even for a measurement apparatus that uses interference of light.

What is claimed is:

1. An actuator, comprising:
a driving beam that includes a beam extending in a direction orthogonal to a predetermined axis and supports an object to be driven;
a driving source that is formed on a first surface of the beam and causes the object to rotate around the predetermined axis; and
a rib formed on a second surface of the same beam, wherein
a notch is formed in a portion of the driving source to face an end of the rib across the beam in a thickness direction of the beam.

2. The actuator as claimed in claim 1, wherein
the driving beam includes multiple beams extending in the direction orthogonal to the predetermined axis; and
ends of each adjacent pair of the beams are connected to each other via a turnaround part such that the driving beam forms a zig-zag bellows structure as a whole.

3. The actuator as claimed in claim 2, wherein a distance from the rib to a joint between the turnaround part and the beam on which the rib is formed is greater than or equal to 10% and less than or equal to 20% of a length of the beam in the direction orthogonal to the predetermined axis.

4. The actuator as claimed in claim 1, wherein the rib has a width in a longitudinal direction of the beam and a length in a lateral direction of the beam, and the width is shorter than the length.

5. The actuator as claimed in claim 1, wherein a length of the rib in a direction of the predetermined axis is greater than or equal to 70% of a width of the beam.

6. The actuator as claimed in claim 1, wherein the notch has a semicircular shape in plan view of the beam and is formed by removing a portion of the driving source on the first surface of the beam.

7. The actuator as claimed in claim 1, wherein a depth of the notch in a direction of the predetermined axis is greater than or equal to 14% of a length of the rib.

8. The actuator as claimed in claim 1, wherein a difference between a width of the notch in the direction orthogonal to the predetermined axis and a width of the rib is greater than or equal to 0.2 mm.

9. An actuator, comprising:
a driving beam that is connected to an object to be driven and includes multiple beams extending in a direction orthogonal to a predetermined axis, ends of each adjacent pair of the beams being connected to each other via a turnaround part such that the driving beam forms a zig-zag bellows structure as a whole;
driving sources that are formed on first surfaces of the beams and cause the object to rotate around the predetermined axis; and
ribs formed on second surfaces of the beams,
wherein a distance from each of the ribs to a joint between the turnaround part and a corresponding one of the beams is greater than or equal to 10% and less than or equal to 20% of a length of the beams in the direction orthogonal to the predetermined axis.

10. The actuator as claimed in claim 9, wherein each of the ribs has a width in a longitudinal direction of the beams and a length in a lateral direction of the beams, and the width is shorter than the length.

11. The actuator as claimed in claim 9, wherein a length of the ribs in a direction of the predetermined axis is greater than or equal to 70% of a width of the beams.

12. An optical scanning device, comprising:
a mirror including a light reflection surface;
a mirror support that supports the mirror;
a driving beam that includes a beam extending in a direction orthogonal to a predetermined axis and is connected to the mirror support;
a driving source that is formed on a first surface of the beam and causes the mirror support to rotate around the predetermined axis; and
a rib formed on a second surface of the same beam, wherein
a notch is formed in a portion of the driving source to face an end of the rib across the beam in a thickness direction of the beam.

13. An optical scanning device, comprising:
a mirror including a light reflection surface;
a mirror support that supports the mirror;
a driving beam that is connected to the mirror support and includes multiple beams extending in a direction orthogonal to a predetermined axis, ends of each adjacent pair of the beams being connected to each other via a turnaround part such that the driving beam forms a zig-zag bellows structure as a whole;
driving sources that are formed on first surfaces of the beams and cause the mirror support to rotate around the predetermined axis; and
ribs formed on second surfaces of the beams,
wherein a distance from each of the ribs to a joint between the turnaround part and a corresponding one of the beams is greater than or equal to 10% and less than or equal to 20% of a length of the beams in the direction orthogonal to the predetermined axis.

14. The actuator as claimed in claim 1, wherein the notch is formed in each of portions of the driving source that face corresponding ends of the rib across the beam in the thickness direction of the beam.

* * * * *